(12) United States Patent
Liu et al.

(10) Patent No.: US 12,461,938 B2
(45) Date of Patent: Nov. 4, 2025

(54) EXPORTING CUSTOMER DATA USING A COMPLIANT TENANT SHARD

(71) Applicant: Microsoft Technology Licensing, LLC, Redmond, WA (US)

(72) Inventors: Bo Liu, Sammamish, WA (US); Ke Wang, Redmond, WA (US); Ahmed Hassan Mohamed, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/410,410

(22) Filed: Jan. 11, 2024

(65) Prior Publication Data

US 2025/0231963 A1    Jul. 17, 2025

(51) Int. Cl.
*G06F 16/00* (2019.01)
*G06F 16/27* (2019.01)

(52) U.S. Cl.
CPC .......... *G06F 16/273* (2019.01); *G06F 16/275* (2019.01)

(58) Field of Classification Search
None
See application file for complete search history.

(56) References Cited

U.S. PATENT DOCUMENTS

| | | | |
|---|---|---|---|
| 9,667,720 B1* | 5/2017 | Bent | G06F 16/273 |
| 9,754,006 B2* | 9/2017 | Wang | G06F 16/275 |
| 10,296,633 B1* | 5/2019 | Collins | G06F 16/275 |
| 10,366,062 B1* | 7/2019 | Lazier | G06F 3/0652 |
| 10,387,451 B2* | 8/2019 | Habouzit | G06F 16/178 |
| 10,606,864 B2* | 3/2020 | Leiseboer | H04L 63/0428 |
| 2018/0276269 A1* | 9/2018 | Rasscevskis | G06F 16/1865 |
| 2019/0171537 A1* | 6/2019 | Wang | G06F 11/2082 |
| 2021/0034396 A1* | 2/2021 | Denny | G06F 3/065 |
| 2021/0191825 A1* | 6/2021 | Chopra | G06F 11/1451 |
| 2022/0019579 A1* | 1/2022 | Meyerzon | G06N 5/022 |
| 2022/0019622 A1* | 1/2022 | Meyerzon | G06F 40/169 |
| 2022/0019740 A1* | 1/2022 | Meyerzon | G06F 16/313 |
| 2022/0019905 A1* | 1/2022 | Meyerzon | G06N 3/045 |
| 2022/0019908 A1* | 1/2022 | Meyerzon | G06N 5/025 |
| 2022/0100727 A1* | 3/2022 | Li | G06F 16/256 |

* cited by examiner

*Primary Examiner* — Farhan M Syed
(74) *Attorney, Agent, or Firm* — Ray Quinney & Nebeker P.C.; Paul N. Taylor

(57) ABSTRACT

User data is extracted from a user data shard and copied into a user-isolated tenant shard. Instructions for accessing the user data are stored in a separate data store. A tenant administrator computing system retrieves and runs the instructions for accessing and exporting the user data from the user-isolated tenant shard.

20 Claims, 10 Drawing Sheets

EXPORTING CUSTOMER DATA USING A COMPLIANT TENANT SHARD

BACKGROUND

Computer systems are currently in wide use. Many computer systems host services that have a frontend system and a backend system. A user or tenant interacts with the frontend system to manipulate data and perform other functions on data using the backend system.

As but one example, some computer systems expose functionality that accesses, operates on, and stores user data and/or tenant data. The data is often confidential or personally identifying information or other personal information governed by compliance rules that try to ensure that the data does not become available to surreptitious users.

In order to comply with some compliance rules, tenant or customer data is often partitioned or stored in memory shards. A shard is a horizontal partition of data in a database, in which separate shards are stored on separate database server instances. Different memory shards may not be accessible to anyone except the consumer user or tenant user. However, tenant users or consumer users may request their user data in certain scenarios. For instance, where a tenant or customer is leaving an organization or no longer wishes to use the computing services or functionality, the tenant or user may request his or her user data.

The discussion above is merely provided for general background information and is not intended to be used as an aid in determining the scope of the claimed subject matter.

SUMMARY

User data is extracted from a user data shard and copied into a user-isolated tenant shard. Instructions for accessing the user data are stored in a separate data store. A tenant administrator computing system retrieves and runs the instructions for accessing and exporting the user data from the user-isolated tenant shard.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, customer data is often stored in user partitions or user shards in backend computing systems that are hosted to provide functionality to different tenants and users. However, there are scenarios in which customers or tenants request that their data be exported. Such scenarios may occur, for instance, when the users or tenants are leaving the company or for other reasons.

In these scenarios, it can be difficult to export the user data in a compliant way. In such systems, access control is often granted at the shard (storage container) level, and not to specific data items. Therefore, when a data selection query is received, a tenant administrator often does not have access to data in backend user shards. Also, because the user data is saved in a backend computing system, it is difficult for the user to access and export the data.

Therefore, the present description describes a system in which a data request may be received from a user or tenant administrator to export user data. In response, the user data is extracted from a user data shard and is exported and temporarily stored on a secondary storage container that is shared with the tenant administrator. The secondary storage container is referred to herein as a user-isolated tenant shard. The user-isolated tenant shard is partitioned or sharded by user, but is a tenant shard so that a tenant administrator has access to data in that tenant shard. Once the data is exported from the user data shard into the user-isolated tenant shard, export instructions are generated and stored in blob storage (or other storage that is accessible by the tenant administrator). The export instructions provide the tenant administrator with instructions that can be run to export the tenant data from the user-isolated tenant shard. In one example, the data request is associated with a unique identifier and that unique identifier is needed to obtain and/or run the export instructions. Thus, the data is exported to the tenant shard, which is still within the compliance boundary, and the tenant administrator can only access that data if the tenant administrator also has the unique identifier for the data request that was initially submitted. The present system thus enhances the security of data during export operations.

Figure 1:
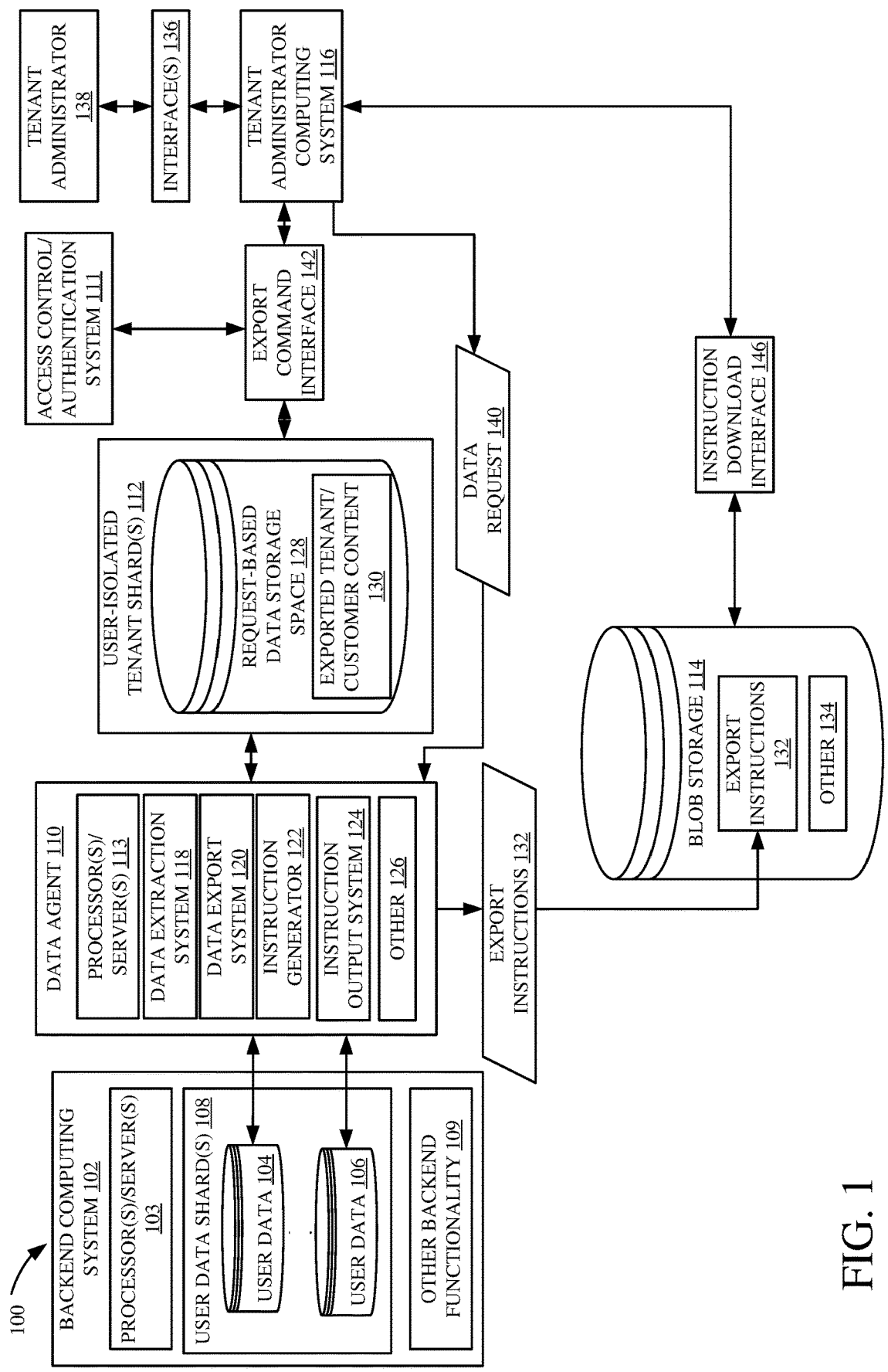
FIG. 1 is a block diagram of one example of a computing system architecture.

FIG. 1 is a block diagram of one example of a computing system architecture 100. FIG. 1 shows that user data may be stored as part of a backend computing system 102. The user data may be stored as user data 104-106 in one or more different user data shards 108 which may be horizontal partitions of data, each shard being stored on a separate database server instance. The data in the user data shards 108 may not be accessible by tenant administrator 138. Architecture 100 also includes a data agent 110, user-isolated tenant shard(s) 112, object-based storage system (e.g., blob storage) 114, and a tenant administrator computing system 116. Backend computing system 102 can also include one or more processors or servers 103 and other backend functionality 109. Data agent 110 includes one or more processors or servers 113, data extraction system 118, data export system 120, instruction generator 122, instruction output system 124, and other items 126. Data agent 110 can create user-isolated tenant shards 112 which can be a memory stamp on a database server instance that includes request-based data storage space 128 that is accessible by tenant administrator 138 and that can store exported tenant/customer data 130. Blob storage 114 can include export instructions 132 and other items 134. In one example, tenant administrator computing system 116 generates interfaces 136 for interaction by a tenant administrator 138. Tenant administrator 138 can interact with interfaces 136 to control and manipulate tenant administrator computing system 116 and portions of data agent 110.

In operation, tenant administrator 138 may interact with interfaces 116 in order to generate a tenant request 140 that requests user data that is stored in user data shards 108. Data extraction system 118 parses the data request 140 to identify the user data 104-106 that is to be exported, and extracts that user data from user data shards 108. Data export system 120 then exports the extracted data, as exported tenant/customer content 130, and stores the tenant/customer content 130 in a user-isolated tenant shard 112. The user-isolated tenant shards 112 are isolated based on the user to which the user data belongs, and user-isolated tenant shards 112 are also accessible by tenant administrator 138 and within the compliance boundary of computing system architecture 100.

Instruction generator 122, in data agent 110, then generates a set of instructions that tenant administrator 138 can access and run in order to access the exported tenant/customer content 130 through an exposed export command interface 142 that may be exposed by the storage system storing user-isolated tenant shards 112. Instruction generator 122 may incorporate, into the instructions, a unique identifier that is used to uniquely identify data request 140 that was submitted by tenant administrator 138. Instruction output system 124 outputs the export instructions 132 for storage in blob storage 114, or other storage that is accessible by tenant administrator 138.

Tenant administrator 138 interacts with interfaces 136 in order to generate a request for the export instructions 132 through an instruction download interface 146 that may be exposed by blob storage 114. In requesting the export instructions 132, tenant administrator 138 uses the unique identifier assigned to data request 140 so that tenant administrator 138 can only obtain the export instructions 132 if tenant administrator 138 also has the unique identifier for the data request 140.

Once the export instructions 132 are downloaded to tenant administrator computing system 116, tenant administrator 138 can run those export instructions 132 to request access to, and export, the exported tenant/customer content 130 through export command interface 142. In one example, and as is discussed in greater detail below with respect to FIG. 6, authentication system 111 authenticates tenant administrator 138 to ensure that tenant administrator 138 has the proper credentials, (role, etc.) to access data in the user-isolated tenant shards 112. Once authenticated, export command interface 142 can be used to export the tenant/customer content 130 to tenant administrator computing system 116, or elsewhere.

Figure 2A:
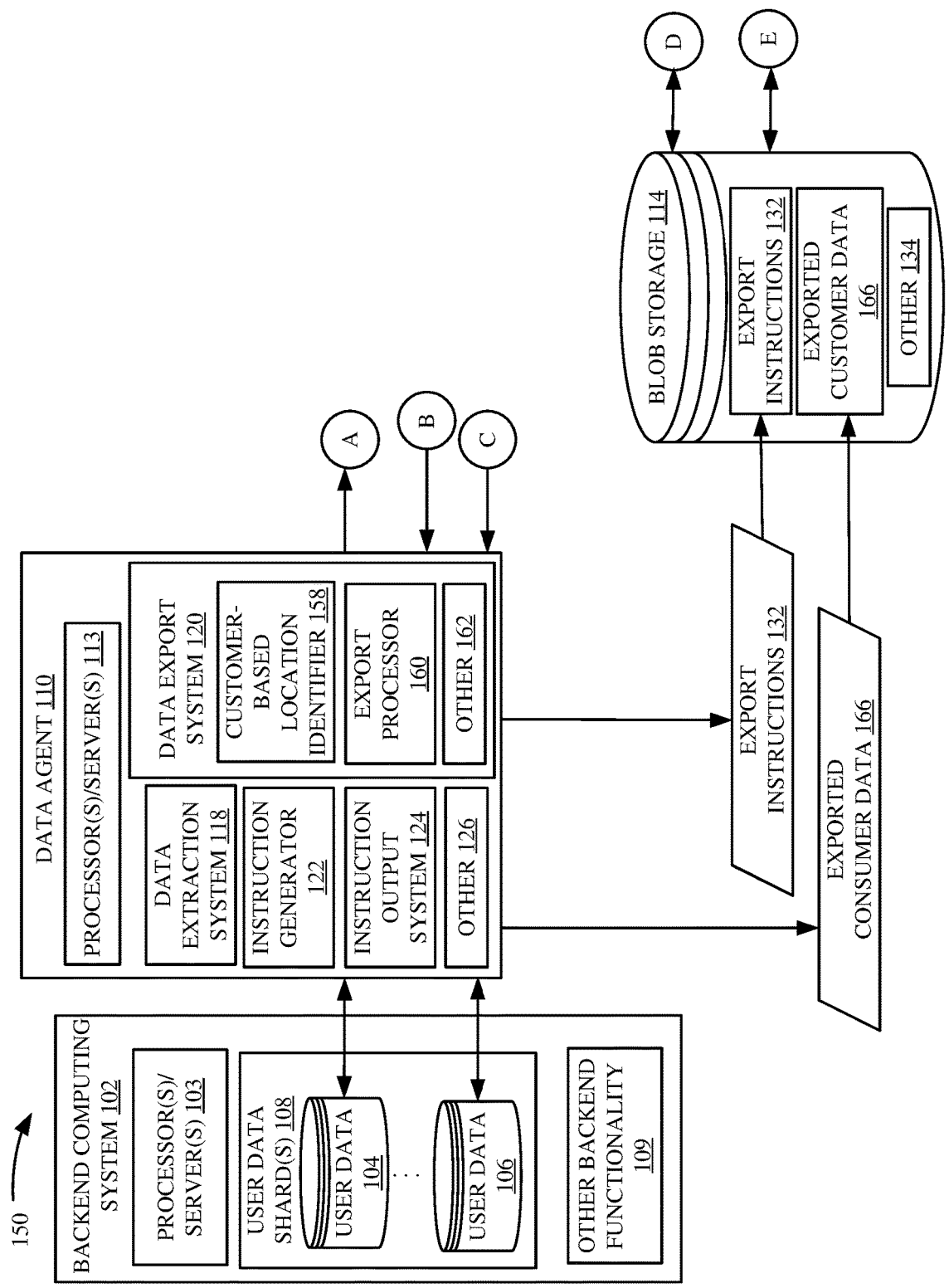
FIGS. 2A and 2B (collectively referred to as FIG. 2) are block diagrams showing one example of a computing system architecture in which multiple different sets of exported customer data are exported.
Figure 2B:
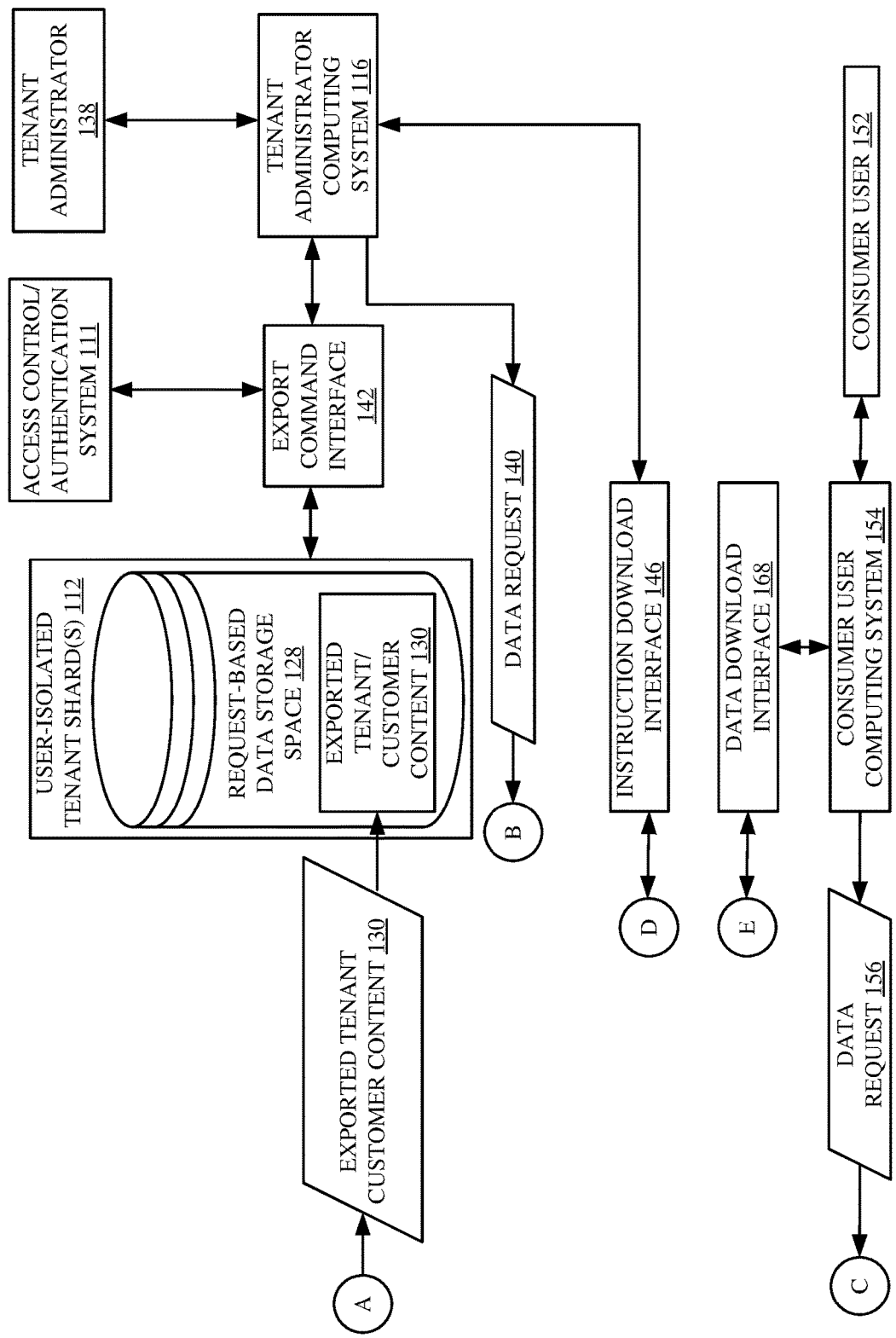

FIGS. 2A and 2B (collectively referred to herein as FIG. 2) show another example of a computing system architecture 150 which is similar to computing system architecture 110 shown in FIG. 1, and similar items are similarly numbered. The example in FIG. 2 shows that architecture 150 contemplates that there may be different types of users or customers that request their data and the data may be exportable to different locations. For instance, in the example shown in FIG. 2, a consumer user 152 interacts with architecture 150 through a consumer user computing system 154. It may be that consumer user 152 generates a data request 156 requesting that his or her data be exported from data shards 108. It may also be that the user data for consumer user 152 can be stored in blob storage 114 while still meeting compliance requirements.

The data export system 120 of data agent 110 includes customer-based location identifier 158, export processor 160, and other items 162. When data agent 110 receives a data request 156 from consumer user 152, data extraction system 118 extracts the requested data. Data export system 120 uses customer-based location identifier 158 to identify the location to which the extracted data is to be stored. For instance, data for a tenant may be exported to user-isolated tenant shards 112 while data for individual consumer users 152 may be exported to blob storage 114. Therefore, customer-based location identifier 158 may be a rules-based component, a model, or another item that identifies at least one characteristic of the user submitting the data request and identifies the location to which the extracted data is to be exported. In one example, customer-based location identifier 158 determines that the requesting user is a consumer user 152 and identifies blob storage 114 as the location to which the extracted data is to be exported. Export processor 160 then controls the export of the extracted data so the exported consumer data 166 is exported to blob storage 114. Blob storage 114 may thus expose a data download interface 168 for access by consumer user 152 through consumer user computing system 154. Consumer user 152 may receive a notification from data agent 110 (or elsewhere) indicating that the exported customer data 166 is now stored in blob storage 114. Consumer user 152 can then interact with data download interface 168 in order to obtain exported customer data 166.

Figure 3A:
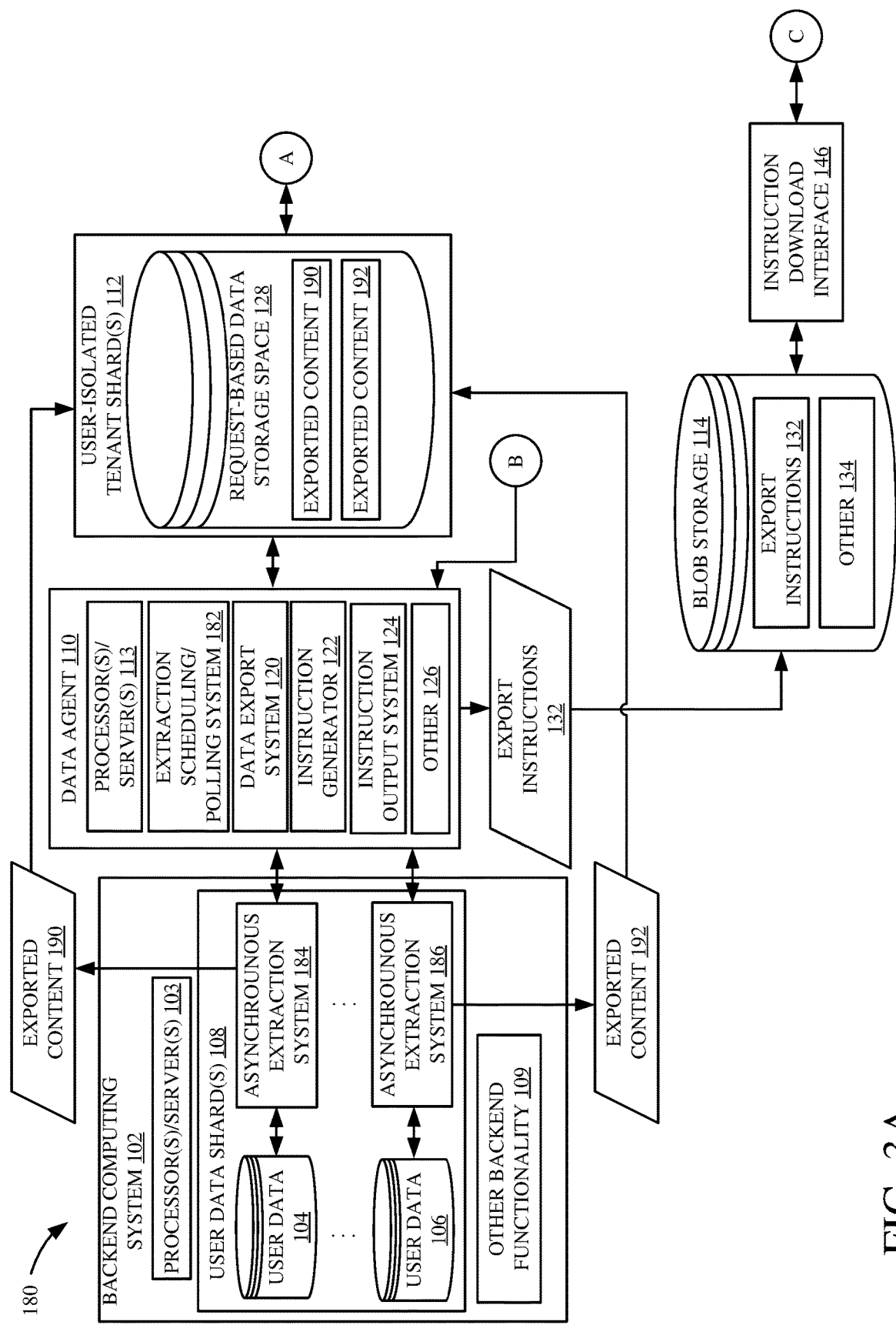
FIGS. 3A and 3B (collectively referred to as FIG. 3) are block diagrams showing another example of a computing system architecture.
Figure 3B:
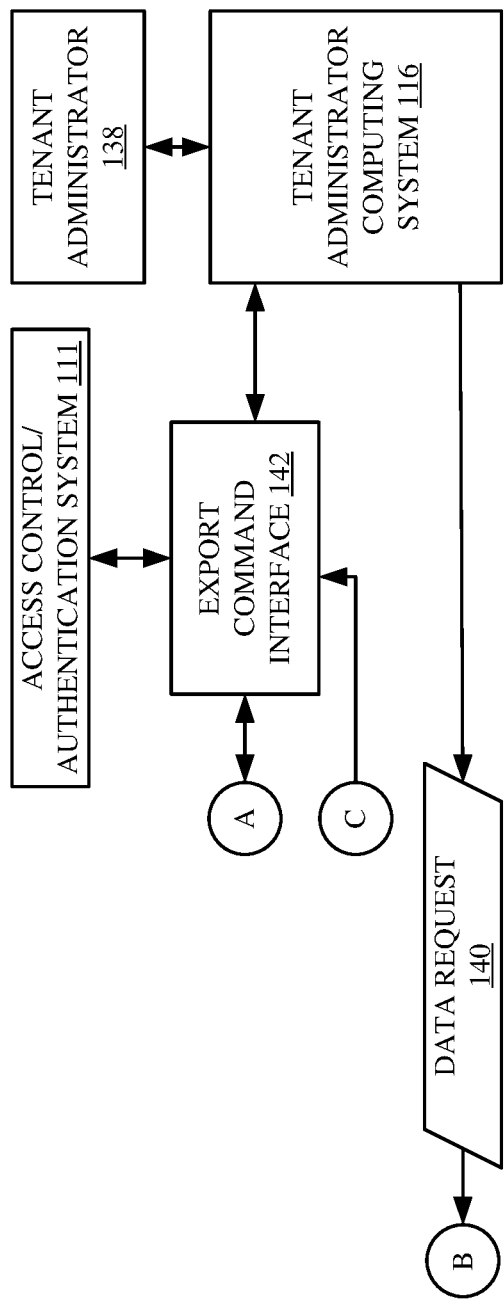

FIGS. 3A and 3B (collectively referred to herein as FIG. 3) shows another example of a computing system architecture 180. Architecture 180 is similar to architectures 110 and 150 illustrated in FIGS. 1 and 2, and similar items are similarly numbered. In FIG. 3, instead of having data extraction system 118 and data export system 120, data agent 110 in FIG. 3 has extraction scheduling/polling system 182. In the example shown in FIGS. 1 and 2, data agent 110 conducted the primary workload in identifying and extracting data from user data shards 108. However, this may be a less scalable and less extendable configuration because data extraction system 118 must include functionality that can be used to extract user data from any data source where it is stored.

Instead, in the example shown in FIG. 3, extraction scheduling/polling system 182 schedules data extractions with asynchronous extraction systems 184-186. Each asynchronous extraction system 184-186 corresponds to a particular data store or data storage system that is storing user data to be extracted. Therefore, asynchronous extraction system 184 is configured to extract user data 104 form a particular data storage system while asynchronous extraction system 186 is configured to extract user data 106 from a different data storage system. Thus, extraction scheduling/polling system 182 only needs to schedule an extraction operation with the asynchronous extraction system corresponding to the data storage system where the user data is stored. Data agent 110 need not have the functionality required to extract the data from all of the different data storage systems, but only needs to have functionality for scheduling a data extraction operation with the asynchronous extraction systems and receiving a notification when the data extraction operation is completed.

Thus, extraction scheduling/polling system 182 may receive the data request 140 and identify which particular asynchronous extraction system 184-186 needs to be scheduled to perform the extraction job. Extraction scheduling/polling system 182 can use a mapping from users or tenants to data storage systems in order to determine which asynchronous extraction system 184-186 are to be scheduled. Extraction scheduling/polling system 182 then provides a scheduling request to the appropriate asynchronous extraction system. Where data is to be extracted from multiple different data storage systems, then extraction scheduling/polling system 182 schedules an extraction job with the asynchronous extraction systems corresponding to each of those data storage systems.

Therefore, in the example shown in FIG. 3, asynchronous extraction system 184 extracts exported content 190 and stores that exported content 190 in the user-isolated tenant shard 112. Asynchronous extraction system 186 extracts exported content 192 and stores that exported content 192 in the user-isolated tenant shard 112 as well. In this way, data agent 110 is more extendable and scalable because it need not incorporate all of the data extraction scheduling/polling system 182 communicated with the functionality that may be used by different data storage systems. Instead, the data extraction functionality in the different data storage systems to schedule data extraction.

Extraction scheduling/polling system 182 may also poll the different asynchronous extraction systems 184-186 where jobs have been scheduled to identify the status of each of those jobs. Once the exported content 190-192 requested by the data request 140 has been exported to user-isolated tenant shard 112, then extraction scheduling/polling system 182 can determine that the data request 140 has been satisfied. A notification of this can be sent from system 182 to tenant administrator 138 and/or such a notification can be sent by each of the asynchronous extraction systems 184-186, as the jobs are completed. Data agent 110 can also mark the data request 140 as having been completed.

Figure 4:
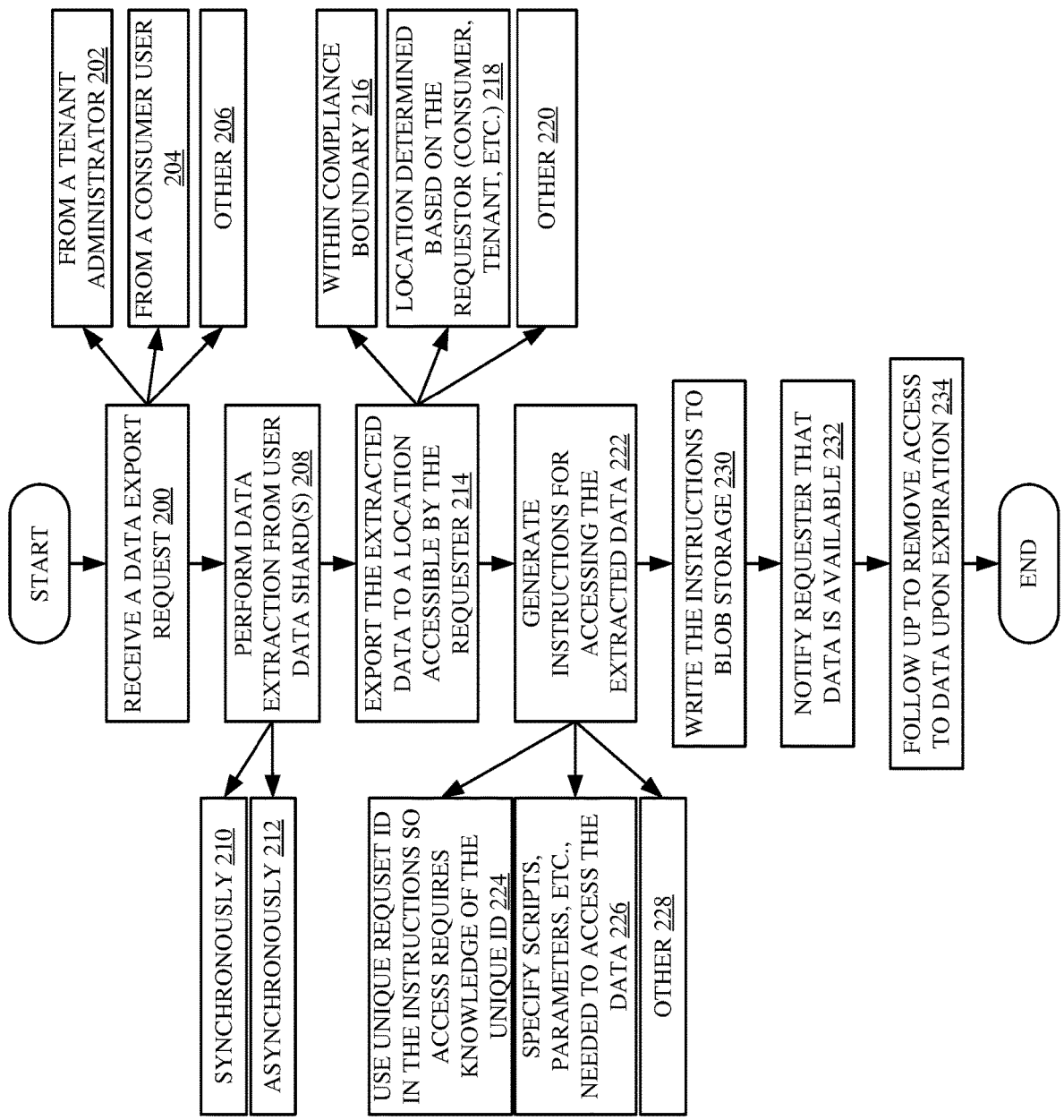
FIG. 4 is a flow diagram illustrating one example of the operation of the computing system architectures shown in FIGS. 1-3.

FIG. 4 is a flow diagram illustrating one example of the operation of the various architectures illustrated in FIGS. 1-3 in receiving a request to export user data, and exporting that data for user access. It is first assumed that data agent 110 receives a data export request 140, as indicated by block 200 in the flow diagram of FIG. 4. The request to export data may be from a tenant administrator 138, as indicated by block 202, from a consumer user 152, as indicated by block 204, from an automated system, or the data request may be received in another way, as indicated by block 206. The system then performs data extraction from the user data shards 108, as indicated by block 208. In the examples shown in FIGS. 1 and 2, the data extraction is performed synchronously in response to the data request by data extraction system 118 in data agent 110, as indicated by block 210 in the flow diagram of FIG. 4. In the example architecture illustrated in FIG. 3, the data extraction is scheduled by scheduling/polling system 182 and is performed asynchronously by asynchronous extraction systems 184-186, as indicated by block 212 in the flow diagram of FIG. 4. The data is then exported to a location that is accessible by the requestor, as indicated by block 214 in the flow diagram of FIG. 4. The extracted data is illustratively exported to a location within a compliance boundary of the computing system, as indicated by block 216. The location may be determined based upon the identity of the requestor (such as whether the requestor is a consumer user 152, a tenant administrator 138, etc.), as indicated by block 218. The extracted data can be exported to a particular location accessible by the requestor in other ways as well, as indicated by block 220.

Instruction generator 122 then generates export instructions 132 that can be used by tenant administrator 138 in order to access the exported tenant customer content 138 from user-isolated tenant shards 112. Generating the instructions is indicated by block 222 in the flow diagram of FIG. 4. In one example, instruction generator 122 uses the unique request identifier (which may be generated by data agent 110 and assigned to the data request or which may be generated by the requesting system or in other ways) that uniquely identifies data request 140 in generating the instructions so that, in order to access the export instructions 132, tenant administrator 138 needs to know the unique request identifier. Using the unique request identifier in generating the instructions is indicated by block 224 in the flow diagram of FIG. 4.

The export instructions 132 may identify specific scripts, parameters, or other items needed to access the exported tenant customer content 130, as indicated by block 226. The export instructions 132 may be encrypted or otherwise processed using the unique data request identifier so that the information can only be decrypted or otherwise accessed by using the unique data request identifier. The export instructions 132 for accessing the exported tenant/customer content 130 can be generated in other ways and include other items as well, as indicated by block 228 in the flow diagram of FIG. 4.

Instruction output system 124 then writes the instructions to blob storage 114 (or any other storage that is accessible by tenant administrator 138). Writing the instructions to blob storage 114 is indicated by block 230 in the flow diagram of FIG. 4. Data agent 110, or another item in architectures 100, 150, 180, then generates an output to tenant administrator computing system 116 indicating that the exported tenant/customer content 130 and the export instructions 132 are available for access by tenant administrator 138. Where customer user 152 has requested the data, then the notification can be provided to consumer user 152. Notifying the requestor that the data is available is indicated by block 232 in the flow diagram of FIG. 4.

In one example, in order to maintain compliance, the exported data may have an expiration date set. Data agent 110 can set and monitor the expiration dates associated with the exported data and remove the exported data after it is expired, so that it is no longer accessible. Following up to remove data upon its expiration is indicated by block 234 in the flow diagram of FIG. 4.

Figure 5:
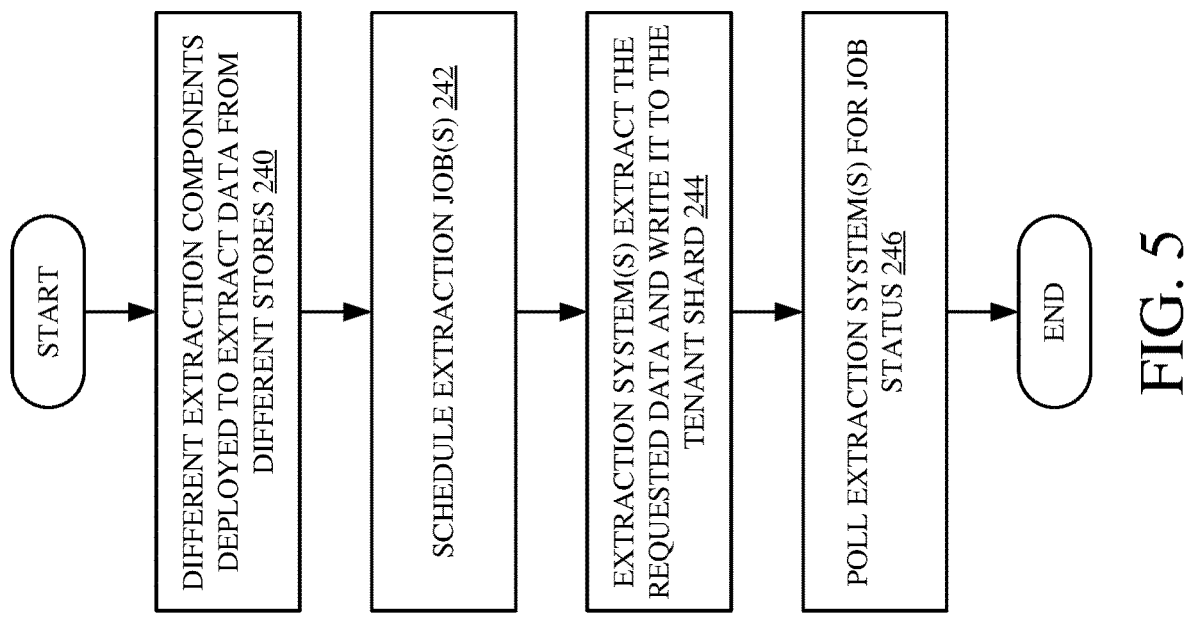
FIG. 5 is a flow diagram showing one example of the operation of the computing system architecture shown in FIG. 3 in which asynchronous data extraction jobs are scheduled.

FIG. 5 is a flow diagram illustrating one example of the extraction scheduling/polling system 182 in the example illustrated in FIG. 3, in which the data extraction is performed by asynchronous extraction systems 184-186. It is first assumed, therefore, that different extraction components (e.g., asynchronous extraction systems 184-186) are deployed to extract data from the different data stores that store user data 104-106. Having different data extraction components deployed in this way is indicated by block 240 in the flow diagram of FIG. 5. After the data request 140 is received, then extraction scheduling/polling system 182 schedules extraction jobs with the different asynchronous extraction systems 184-186 that extract data from the particular data stores where the user data is to be extracted. Scheduling the extraction jobs with the asynchronous extraction systems is indicated by block 242 in the flow diagram of FIG. 5. The asynchronous extraction systems 184-186 extract the requested data and write that data to the user-isolated tenant shard 112 as exported content 190-192. Extracting the data and writing the data as exported data to user-isolated tenant shards 112 is indicated by block 244 in the flow diagram of FIG. 5.

Extraction scheduling/polling system 182 also polls the extraction systems 184-186 for the status of each of the scheduled jobs so that the instructions can be generated, where needed, and so that notifications can be transmitted, as needed. Polling the extraction systems for job status is indicated by block 246 in the flow diagram of FIG. 5.

Figure 6:
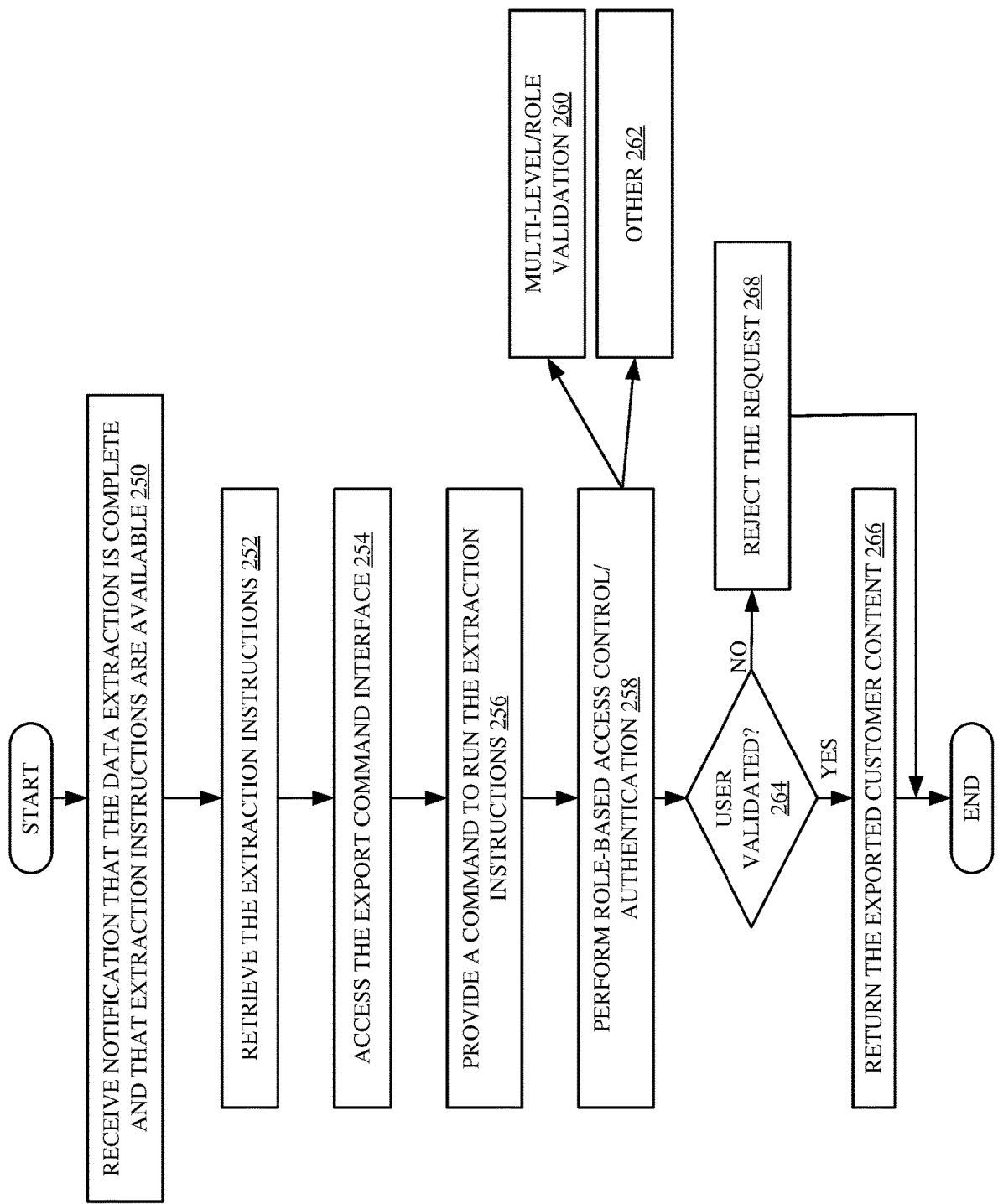
FIG. 6 is a flow diagram illustrating one example of the operation of a tenant administrator computing system in obtaining and running data extraction instructions.

FIG. 6 is a flow diagram illustrating one example of the operation of tenant administrator computing system 116 in accessing export instructions 132 and running those instructions to obtain access to the exported tenant data in user-isolated tenant shards 112. Tenant administrator computing system 116 first receives a notification that the data extraction is complete and that the extraction instructions are available in blob storage 114. Receiving such a notification is indicated by block 250 in the flow diagram of FIG. 6. Tenant administrator 138 then controls tenant administrator computing system 116 to interact with instruction download interface 146 to download export instructions 132. Retrieving the export instructions 132 is indicated by block 252 in the flow diagram of FIG. 6. Using the export instructions 132, tenant administrator computing system 116 accesses the export command interface 142 and provides a command (according to the export instructions 132) to run the export instructions 132 to obtain access to the exported content 190-192. Accessing the export command interface 142 is indicated by block 254 in the flow diagram of FIG. 6 and providing a command to run the export instructions is indicated by block 256.

Export command interface 142 interacts with access control/authentication system 111 to perform role-based access control (or other authentication and authorization) as indicated by block 258 in the flow diagram of FIG. 6. The role-based access control may be multi-level control in which a first role-based access control is performed in order to allow tenant administrator 138 to even access the export command interface 142. A second level of role-based access control may also be performed in order to allow tenant administrator 138 to access the particular exported customer content 130. Performing multi-level role validation and access control is indicated by block 260 in the flow diagram of FIG. 6. Access control, authorization, and authentication can be performed in any of a wide variety of other ways as well, as indicated by block 262.

If the tenant administrator 132 is authenticated and provided with access, as determined at block 264 in the flow diagram of FIG. 6, then export command interface 142 returns the exported customer content 130 to tenant administrator 138, as indicated by block 266. However, if the authentication, authorization, and/or access control fails, at any level, then the request to obtain the exported customer content 130 is rejected, as indicated by block 268.

It can thus be seen that the present description describes a system which provides access to customer data in a compliant manner. The customer data is copied (in some cases asynchronously) from a customer shard in a backend system to a user-isolated tenant shard and instructions for accessing the data are sent to a separate store. Therefore, a tenant administrator 138 can retrieve the instructions and use them to access the customer data, even though the data is still within the compliance boundary of the system. This enables the system to service data requests in a secure and compliant manner.

It will be noted that the above discussion has described a variety of different systems, components, agents, generators, and/or logic. It will be appreciated that such systems, components, agents, generators, and/or logic can be comprised of hardware items (such as processors and associated memory, or other processing components, some of which are described below) that perform the functions associated with those systems, components, agents, generators, and/or logic. In addition, the systems, components, agents, generators, and/or logic can be comprised of software that is loaded into a memory and is subsequently executed by a processor or server, or other computing component, as described below. The systems, components, agents, generators, and/or logic can also be comprised of different combinations of hardware, software, firmware, etc., some examples of which are described below. These are only some examples of different structures that can be used to form the systems, components, agents, generators, and/or logic described above. Other structures can be used as well.

The present discussion has mentioned processors and servers. In one example, the processors and servers include computer processors with associated memory and timing circuitry, not separately shown. The processors and servers are functional parts of the systems or devices to which they belong and are activated by, and facilitate the functionality of the other components or items in those systems.

Also, a number of user interface (UI) displays have been discussed. The UI displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which the mechanisms are displayed is a touch sensitive screen, the mechanisms can be actuated using touch gestures. Also, where the device that displays them has speech recognition components, the mechanisms can be actuated using speech commands.

A number of data stores have also been discussed. It will be noted the data stores can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 7:
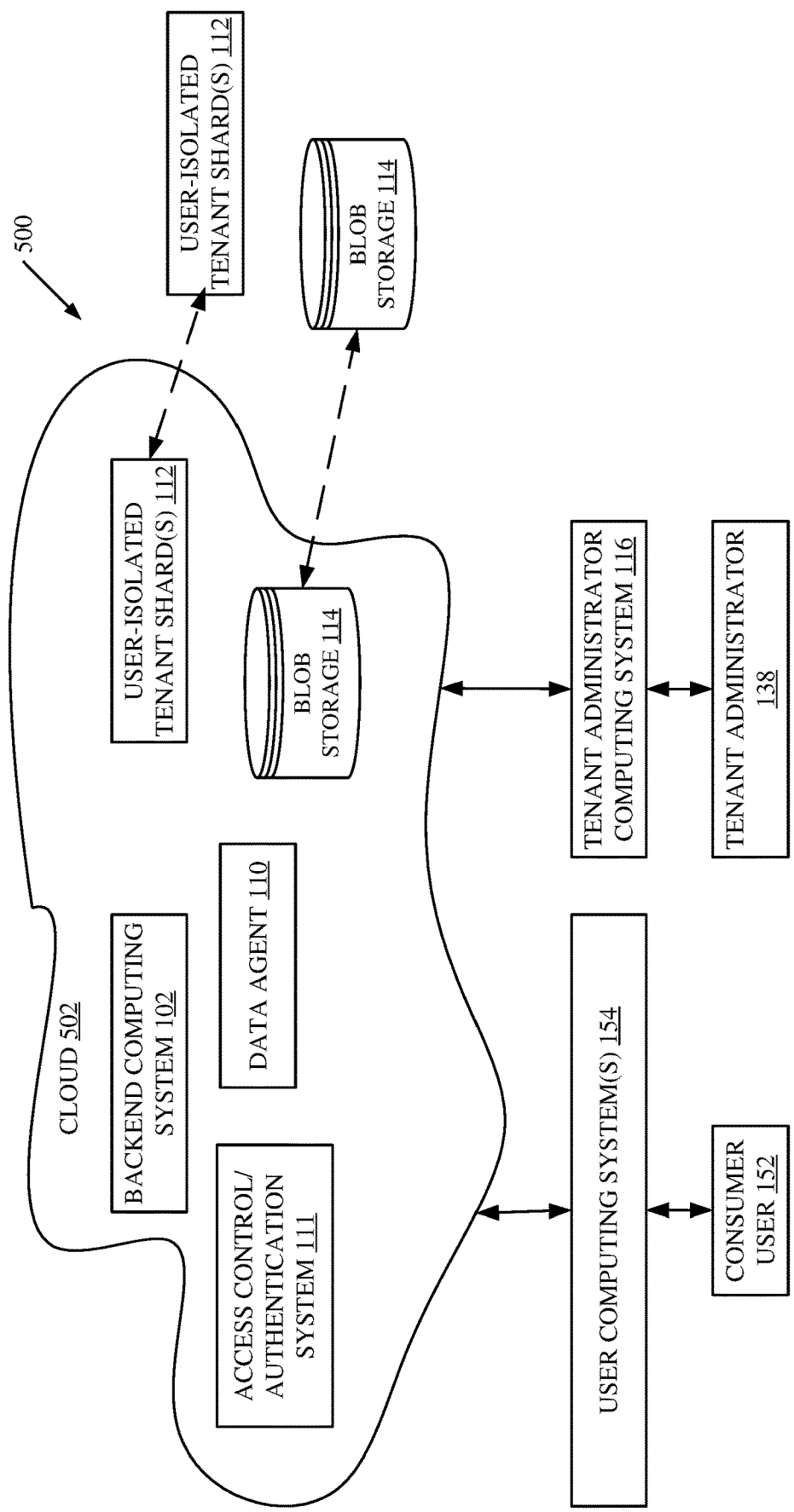
FIG. 7 is a block diagram showing one example of the computing system architectures shown in previous figures deployed in a remote server architecture.

FIG. 7 is a block diagram of architectures 100, 150, 180 shown in FIGS. 1-3, except that the elements are disposed in a cloud computing architecture 500. Cloud computing provides computation, software, data access, and storage services that do not require end-user knowledge of the physical location or configuration of the system that delivers the services. In various examples, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, the components and functions can be provided from a conventional server, or the components and functions can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 7, some items are similar to those shown in FIGS. 1-3 and they are similarly numbered. FIG. 7 specifically shows that systems 102 and 111, data agent 110, blob storage 114, and/or shards 112 can be located in cloud 502 (which can be public, private, or a combination where portions are public while others are private). Therefore, user 152 uses a user device with user computing system 154, and tenant administrator 138 uses tenant administrator computing system 116 to access those systems through cloud 502.

FIG. 6 also depicts another example of a cloud architecture. FIG. 6 shows that it is also contemplated that some elements of computing system architectures 100, 150, 180 can be disposed in cloud 502 while others are not. By way of example, user-isolated tenant shards 112 and/or blob storage 114 (or other items) can be disposed outside of cloud 502, and accessed through cloud 502. Regardless of where they are located, they can be accessed directly by systems 116, 154, through a network (either a wide area network or a local area network), the items can be hosted at a remote site by a service, or the items can be provided as a service through a cloud or accessed by a connection service that resides in the cloud. All of these architectures are contemplated herein.

It will also be noted that architecture 100, 150, 180, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
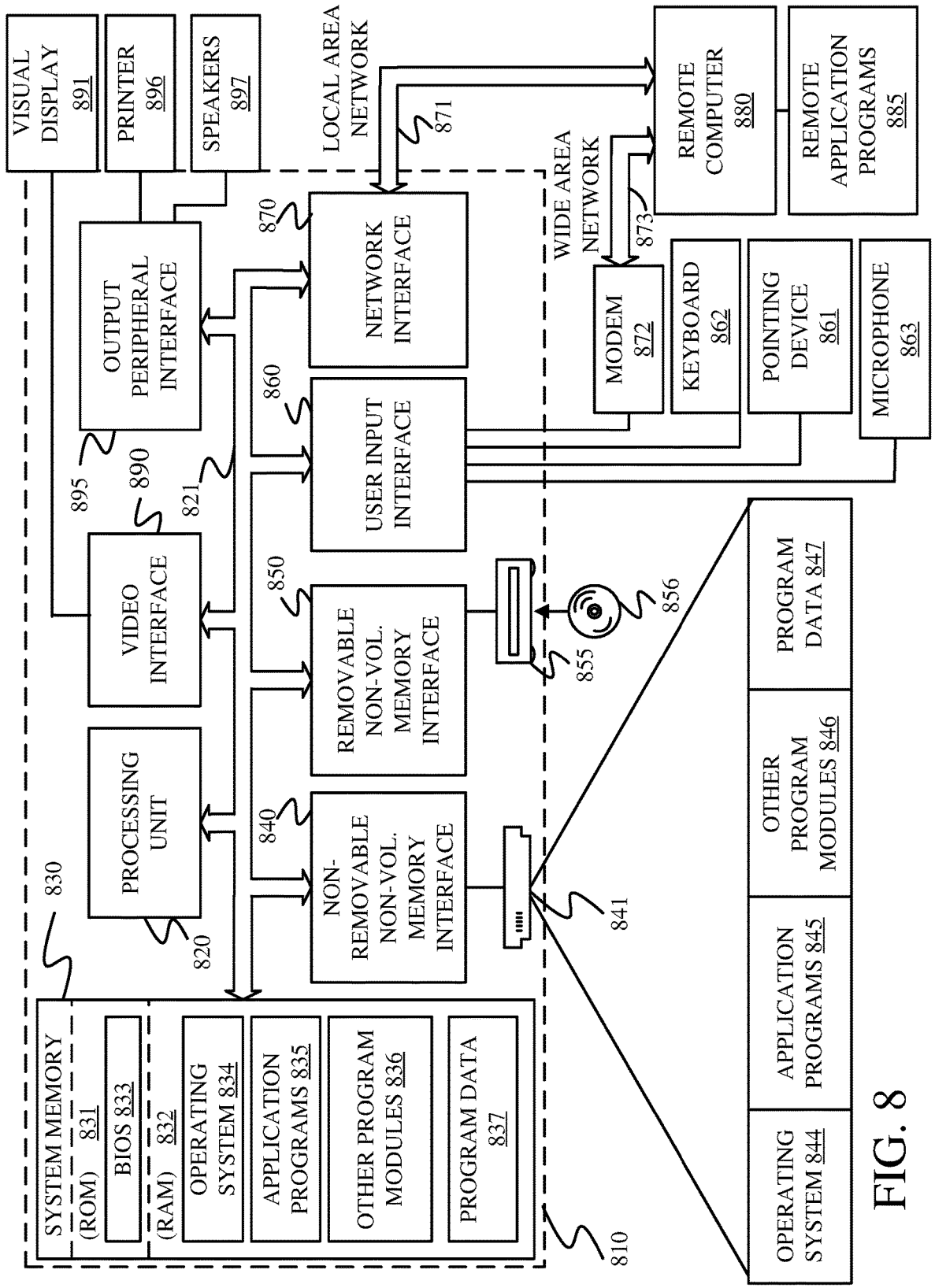
FIG. 8 is a block diagram showing one example of a computing environment that can be used in systems and architecture illustrated in previous figures.

FIG. 8 is one example of a computing environment in which architecture 100, 150, 180, or parts of them, (for example) can be deployed. With reference to FIG. 10, an example system for implementing some embodiments includes a computing device in the form of a computer 810 programmed to operate as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIGS. 1-3 can be deployed in corresponding portions of FIG. 8.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is a computer implemented method, comprising:
  receiving a data request requesting user data from a user data shard in a backend computing system, the user data in the user data shard being inaccessible by a tenant administrator;
  extracting the user data from the user data shard;
  storing the user data in a first storage container of a first data store that is accessible by the tenant administrator;
  generating export instructions for exporting the user data from the first storage container; and
  storing the export instructions in a second data store that is accessible by the tenant administrator.

Example 2 is the computer implemented method of any or all previous examples wherein extracting the user data comprises:
  scheduling an extraction job, for extraction of the user data from the user data shard, with a first asynchronous extraction system corresponding to the first data store.

Example 3 is the computer implemented method of any or all previous examples wherein scheduling comprises:
  providing the first asynchronous extraction system with an extraction request including an identity of the user data to be extracted from the user data shard and a destination where the user data is to be stored after extraction from the user data shard.

Example 4 is the computer implemented method of any or all previous examples wherein extracting the user data comprises:
  polling the first asynchronous extraction system to determine a status of the extraction job.

Example 5 is the computer implemented method of any or all previous examples wherein storing the export instructions in the second data store comprises:
  when the status of the extraction job indicates that the extraction job is complete, uploading the export instructions to the second data store; and
  marking the data request to indicate that the data request has been completed.

Example 6 is the computer implemented method of any or all previous examples wherein generating export instructions comprises:
  identifying a unique identifier corresponding to the data request; and
  generating the export instructions based on the unique identifier corresponding to the data request.

Example 7 is the computer implemented method of any or all previous examples and further comprising:
  detecting a call through the export command interface to run the export instructions; and
  running the export instructions to return the user data from the first storage container.

Example 8 is the computer implemented method of any or all previous examples and further comprising:
  detecting whether an expiration time has passed since the user data was stored in the first storage container; and if so, removing access to the user data from the first storage container.

Example 9 is the computer implemented method of any or all previous examples wherein extracting the user data from the user data shard comprises:
synchronously extracting the user data from the user data shard and storing the user data in the first storage container in response to the data request.

Example 10 is the computer implemented method of any or all previous examples wherein storing the user data in a first storage container comprises:
identifying a location of the second data store based on who generated the data request; and
storing the user data at the identified location of the second data store.

Example 11 is a computer system, comprising:
at least one processor;
a data agent, implemented by the at least one processor, configured to receive a data request requesting user data from a user data shard in a backend computing system, the user data shard being inaccessible by a tenant administrator;
a data extraction system, implemented by the at least one processor, configured to extract the user data from the user data shard;
a data export system configured to store the user data in a user-isolated tenant data shard of a first data store, the user-isolated tenant shard being accessible by the tenant administrator;
an instruction generator, implemented by the at least one processor, configured to generate export instructions for exporting the user data from the user-isolated tenant data shard using an export command interface to the first data store; and
an instruction output system configured to output the export instructions to a second data store.

Example 12 is the computer system of any or all previous examples wherein the data extraction system comprises:
a scheduling system configured to schedule an extraction job, for extraction of the user data from the user data shard, with a first asynchronous extraction system corresponding to the first data store.

Example 13 is the computer system of any or all previous examples wherein the data extraction system comprises:
a polling system configured to poll the first asynchronous extraction system to determine a status of the extraction job.

Example 14 is the computer system of any or all previous examples wherein the instruction output system is configured to upload the export instructions to the second data store when the status of the extraction job indicates that the extraction job is complete.

Example 15 is the computer system of any or all previous examples wherein the instruction generator is configured to identify a unique identifier corresponding to the data request and generate the export instructions based on the unique identifier corresponding to the data request.

Example 16 is the computer system of any or all previous examples wherein the data agent is configured to detect that an expiration time has passed since the user data was stored in the user-isolated tenant data shard and, in response, remove access to the user data from the tenant data shard.

Example 17 is the computer system of any or all previous examples wherein the data extraction system comprises:
a synchronous data extraction system configured to synchronously extract the user data from the user data shard in response to the data request.

Example 18 is the computer system of any or all previous examples wherein the data export system comprises:
a requester-based location identifier configured to identify a location of the second data store based on who generated the data request; and
an export processor configured to output the user data to the identified location of the second data store.

Example 19 is a computer implemented method, comprising:
receiving a request requesting confidential user data from a user data partition in a computing system;
copying the confidential user data to a tenant data partition that resides behind a compliance boundary;
generating data access instructions for exporting the user data from the tenant data partition; and
storing the data access instructions in an object-based data storage system.

Example 20 is the computer implemented method of any or all previous examples wherein copying the confidential user data comprises:
scheduling an asynchronous data extraction job with an asynchronous extraction system corresponding to the first data store; and
polling a status of the asynchronous data extraction job, and wherein storing the data access instructions comprises storing the data access instructions in the object-based data storage system at a time based on the status of the asynchronous data extraction job.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A computer implemented method, comprising:
receiving a request from a requestor requesting confidential user data from a user data partition in a computing system;
copying the confidential user data to a tenant data partition that resides behind a compliance boundary by:
scheduling an asynchronous data extraction job with an asynchronous extraction system corresponding to the user data partition; and
polling a status of the asynchronous data extraction job;
generating data access instructions for exporting the user data from the tenant data partition to a data location determined based upon the identity of the requestor;
storing the data access instructions in an object-based data storage system at a time based on the status of the asynchronous data extraction job; and
generating an output to the requestor indicating that the confidential user data and the data access instructions are available for access.

2. The computer implemented method of claim 1, further comprising:
authenticating an identify of the requestor; and
running the data access instructions to export the user data from the tenant data partition to a location based on the identity of the requestor.

3. The computer implemented method of claim 1, wherein generating the data access instructions comprises embedding a unique request identifier that corresponds to the request.

4. The computer implemented method of claim 3, further comprising encrypting the data access instructions with the unique request identifier.

5. The computer implemented method of claim 3, further comprising exposing a download interface through which the data access instructions can be retrieved only when the unique request identifier is supplied.

6. The computer implemented method of claim 1, further comprising transmitting a notification to the requestor indicating that the confidential user data and the data access instructions are available.

7. The computer implemented method of claim 1, further comprising, after an expiration time elapses, removing access to the confidential user data stored in the tenant data partition.

8. The computer implemented method of claim 1, wherein copying the confidential user data further comprises synchronously extracting the confidential user data from the user data partition in response to the request.

9. The computer implemented method of claim 1, wherein the data location to which the confidential user data is exported is within a compliance boundary and is selected based on the identity of the requestor.

10. The computer implemented method of claim 9, wherein the data location is a blob storage system.

11. The computer implemented method of claim 1, wherein scheduling the asynchronous data extraction job comprises using a mapping of users or tenants to data storage systems to identify the asynchronous extraction system that corresponds to the user data partition.

12. The computer implemented method of claim 11, further comprising scheduling respective asynchronous data extraction jobs with a plurality of asynchronous extraction systems that correspond to different data storage systems storing portions of the confidential user data.

13. The computer implemented method of claim 12, further comprising polling each asynchronous extraction system to determine a status of each asynchronous data extraction job until every job completes.

14. The computer implemented method of claim 1, further comprising, when the status of the asynchronous data extraction job indicates completion, writing a completion marker associated with the request in the object-based data storage system.

15. The computer implemented method of claim 1, further comprising authenticating the requestor by performing multi-level role-based access control before exporting the confidential user data.

16. The computer implemented method of claim 1, wherein the data access instructions specify at least one executable script configured to invoke a secure export interface of the tenant data partition and at least one parameter comprising authentication metadata or a destination location identifier required for the export of the confidential user data.

17. The computer implemented method of claim 1, wherein storing the data access instructions comprises writing the data access instructions to a blob storage system that is logically and physically distinct from the tenant data partition, such that access permissions for the blob storage are governed independently.

18. The computer implemented method of claim 1, further comprising generating, for an administrator, a secure user interface coupled to an authentication system and a data access instruction retrieval interface, the user interface being configured to permit submission of the request and authenticated retrieval of the data access instructions.

19. The computer implemented method of claim 7, further comprising setting the expiration time and monitoring the expiration time until the confidential user data is removed.

20. The computer implemented method of claim 10, wherein selecting the data location is performed by a customer-based location identifier configured to apply one or more user classification rules to determine whether the data location is the tenant data partition or the blob storage system.

* * * * *